United States Patent [19]

Ewell et al.

[11] Patent Number: 5,642,391

[45] Date of Patent: Jun. 24, 1997

[54] METHOD AND APPARATUS FOR MONITORING CHANNEL PERFORMANCE ON A CHANNEL USING ALTERNATE MARK INVERSION PROTOCOLS

[75] Inventors: Lujack Ewell, Buford; Larry A. Jackson, Roswell; Larry D. Bishop, Norcross, all of Ga.

[73] Assignee: Conklin Instrument Corporation, Pleasant Valley, N.Y.

[21] Appl. No.: 573,448

[22] Filed: Dec. 15, 1995

[51] Int. Cl.$^6$ .................................................. H03K 21/00
[52] U.S. Cl. ................................. 377/39; 377/33; 377/37
[58] Field of Search ................................. 377/33, 37, 39

[56] References Cited

U.S. PATENT DOCUMENTS

| | | | |
|---|---|---|---|
| 3,965,294 | 6/1976 | Rerz et al. | 178/69 |
| 4,363,123 | 12/1982 | Grover | 371/5 |
| 5,394,145 | 2/1995 | Gupta et al. | 341/73 |
| 5,504,761 | 4/1996 | Shinbashi et al. | 371/57.2 |
| 5,568,529 | 10/1996 | Masuda | 377/39 |

*Primary Examiner*—Margaret Rose Wambach
*Attorney, Agent, or Firm*—Fish & Richardson P.C.

[57] ABSTRACT

A method and apparatus monitor the performance of a DDS loop connecting an information transmitter to an information receiver. The information transmitter is typically at a customer premises while the receiver is typically an OCU at the receiving local office. The DDS loop uses an alternate mark inversion communications protocol and the monitoring method and apparatus feature circuitry for determining a current imbalance on the DDS loop. The numbers of positive and negative pulses on the line are individually counted and if the count of the two counters used deviates either positively or negatively from each other by specified amounts, an error event is declared. If the error events meet a statistical timing criterion, a channel error is declared and appropriate steps are undertaken to prevent signals coming from the channel from interfering with other signals available at the local office.

16 Claims, 3 Drawing Sheets

| CURRENT S COUNT (NEG PULSES) | ERROR IF P COUNT (POS PULSES) IS: |
|---|---|
| 0 | 3, 4, 5, OR 6 |
| 1 | 4, 5, 6, OR 7 |
| 2 | 0, 5, 6, OR 7 |
| 3 | 0, 1, 6, OR 7 |
| 4 | 0, 1, 2, OR 7 |
| 5 | 0, 1, 2, OR 3 |
| 6 | 1, 2, 3, OR 4 |
| 7 | 2, 3, 4, OR 5 |

METHOD AND APPARATUS FOR MONITORING CHANNEL PERFORMANCE ON A CHANNEL USING ALTERNATE MARK INVERSION PROTOCOLS

BACKGROUND OF THE INVENTION

The invention relates generally to monitoring a channel in a telephone system, and in particular to a method and apparatus for monitoring DDS loop performance between the customer equipment and a office channel unit (OCU).

Dataphone Digital Service (DDS) has been widely available for sometime in the United States. The local loop of Dataphone Digital Service employs a communications protocol identified as alternate mark inversion (AMI) and provides digital signals between the customer premises and the local office, typically to an office channel unit (OCU). The communications use alternate mark inversion to provide a zero average current on the loop. This provides, therefore, an absence of net current flowing in either direction.

In accordance with the alternate mark inversion protocol, digital signals are converted from a "one" and "zero" format such as is found in typical digital electronic circuits to a format where a one bit is transmitted as a pulse, either positive or negative, while a zero is transmitted as no pulse. The pulses alternate on the line in order to maintain the zero average current flow across the line.

In circumstances where there are channel errors, which can be caused, for example, by electrical noise on the line, or equipment which is operating improperly, there results a line fault which can be serious not only to that particular line, but to other lines as well. In particular, when the DDS loop is operated as part of a multipoint circuit, that is, when several customers share a common communications channel using a multipoint unit located at the central office, one customer to central office DDS loop, producing incorrect signals, can adversely affect other customers coming into the same junction point. This situation is known as streaming branches, and the duplex path from the multipoint junction unit to the customer's control unit is called a branch.

Since errors on the system from one customer may adversely affect the operation of the multipoint junction unit with regard to other customers, it is important to ensure that such errors are caught early. For this reason, performance monitoring equipment has been developed and used which provides certain levels of reliability in monitoring the performance. Such equipment typically attempts to recognize and distinguish between so-called intentional bipolar violations and unintentional bipolar violations. It is desirable to consider an alternate mechanism for detecting errors on the channel which measures and quantifies the current itself, and signals when a zero average current condition no longer exists.

SUMMARY OF THE INVENTION

Accordingly, the invention relates to a method and apparatus for monitoring the performance of a DDS loop connecting an information transmitter (typically at the customer premises) to an information receiver (typically an OCU at the receiving office). The DDS loop, as noted above, uses an alternate mark inversion communications protocol for effecting communications between the transmitter and receiver. The monitoring method features the steps of counting, at the receiver, a first pulse of a selected polarity, separately counting at the receiver succeeding positive and negative pulses received from the DDS loop, identifying an error and declaring an error event whenever a difference between the counts of the positive and negative pulses exceeds a selected positive value, or is less than a selected negative value. The error event signals an unacceptable current imbalance on the DDS loop. Thereafter, if the errors on the DDS loop meet a preset statistical timing criterion, the method replaces, at the receiver, the signals coming from the transmitter on the failed DDS loop.

In particular embodiments of the invention, the replacement step is terminated after an uninterrupted error free sequence of signals is received at the receiver from the DDS loop. In a particular and preferred embodiment, the error free sequence of signals is thirty-two seconds long. In another aspect, the method further features the step of searching for a pattern of error-seconds wherein, for a succession of a certain number of error-seconds, a maximum time duration between the beginning of one error-second and the beginning of a next error-second is no greater than an error threshold value. Preferably, the certain number equals six and the error threshold value equals twelve seconds.

Further, in accordance with a particular embodiment of the invention, the counting step first counts a positive pulse; and then, the selected positive value preferably equals two, the selected negative value equals minus one, and the difference is determined by subtracting the number of negative pulses from the number of positive pulses.

The apparatus of the invention features, at the receiver, a first counter connected to the DDS loop for counting pulses of a first selected polarity, a second counter, also at the receiver, connected to the DDS loop for counting pulses of a second polarity, and circuitry for resetting the counters and for releasing the counters to count incoming pulses. The apparatus further features a control circuitry for enabling the first counter to count a first pulse of the first selected polarity and for thereafter enabling both counters for counting succeeding positive and negative pulses on the DDS loop. Further circuitry is responsive to the counts contained in the counters for signaling an error event whenever a difference between the counts in the counters either exceeds a first selected positive value or is less than a second selected negative value. The circuit thus declares a current imbalance on the DDS loop. The apparatus further features signal modifying circuitry for replacing, at the receiver, the signals received from the DDS loop when a statistical timing criterion of error events is met.

The apparatus, in particular aspects of the invention, provides that the signal modifying circuitry terminates the replacing of signals after receipt of an error free sequence on the DDS loop for at least a minimum fixed period of time, for example thirty-two seconds. In a particular embodiment, the apparatus features a state machine circuitry for starting a timed period after the occurrence of an error event, and during which further error events are ignored. After a time-out occurs, the count responsive circuitry looks for a next error event.

The apparatus also features in one aspect of the invention, a state machine for declaring a channel error when a sequence of at least a minimum number, six in one aspect of the invention, of error-time periods occurs, wherein the time duration between the beginning of an error-time period and the beginning of a next error-time period is no greater than a predetermined error threshold, preferably, in the illustrated embodiment less than or equal to twelve seconds.

BRIEF DESCRIPTION OF THE DRAWINGS

Other objects, advantages, and features of the invention will be apparent from the written description which follows taken together with the drawings in which.

DESCRIPTION OF A PREFERRED EMBODIMENT

Figure 1:
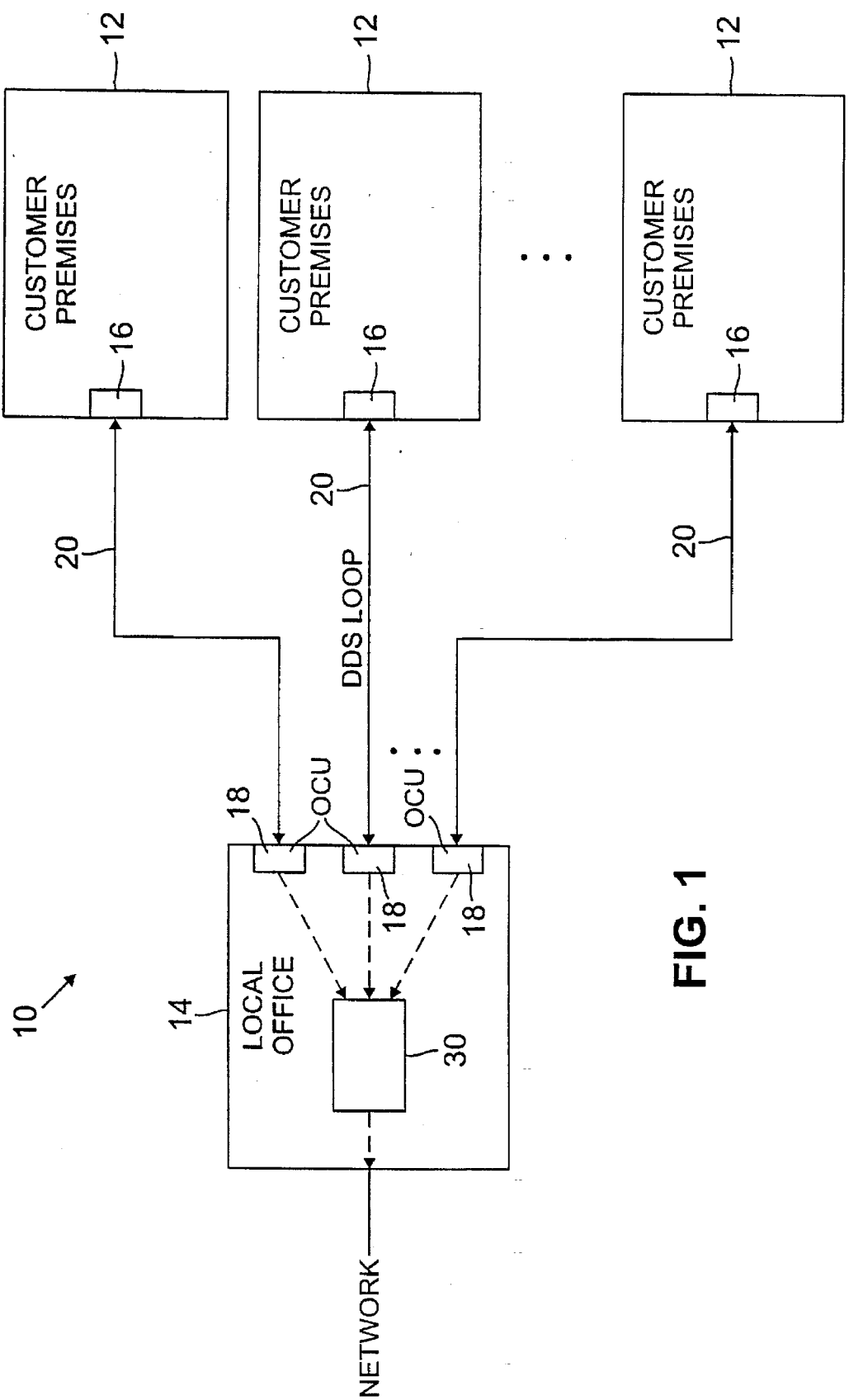
FIG. 1 is an overall block diagram of the environment in which the invention is used.

Referring to FIG. 1, in a typical data transmission system 10 from a plurality of customer premises 12 to a local office 14 in a DDS system, the communications between the customer premises and the local office occur between each customer premises interface unit 16 and the OCU 18 situated at the local office 14. Communications take place over the DDS loop segments 20 interconnecting the interface 16 and a respective OCU 18.

At the local office, if communications are received over DDS loops 20 and are combined and placed on the network through use of a multipoint Junction unit 30, it is important that none of the data communications over any DDS loop is in substantial error. Such errors can effectively monopolize the junction unit 30 thereby preventing communications over other DDS loops and causing substantial errors and/or loss of information in the system.

As noted above, the communications protocol employed between the customer premises and the local office over DDS loop 20 is the alternate mark inversion format. In accordance with this synchronous communications format, a "one" is provided as either a positive pulse and a negative pulse and a "zero" is communicated as no pulse. The pulses representing a "one" alternate in polarity so that the average current on the loop is zero. At the OCU, in accordance with the invention, circuitry is provided to test the load balance and to ensure that the average current is approximately zero. If excessive pulses of either polarity are received, meaning that the load balance is in error, the OCU 18 corresponding to that DDS loop responds by placing an abnormal station code (ASC) on its outgoing line toward the network for that channel, and thereby effectively blocks the signals being received, in error, along the DDS loop from the customer premises.

Accordingly, an improperly operating DDS loop can not take control of the multipoint junction unit 30 and thereby cause substantial error or faults to occur in the operation at the local office.

Figure 2:
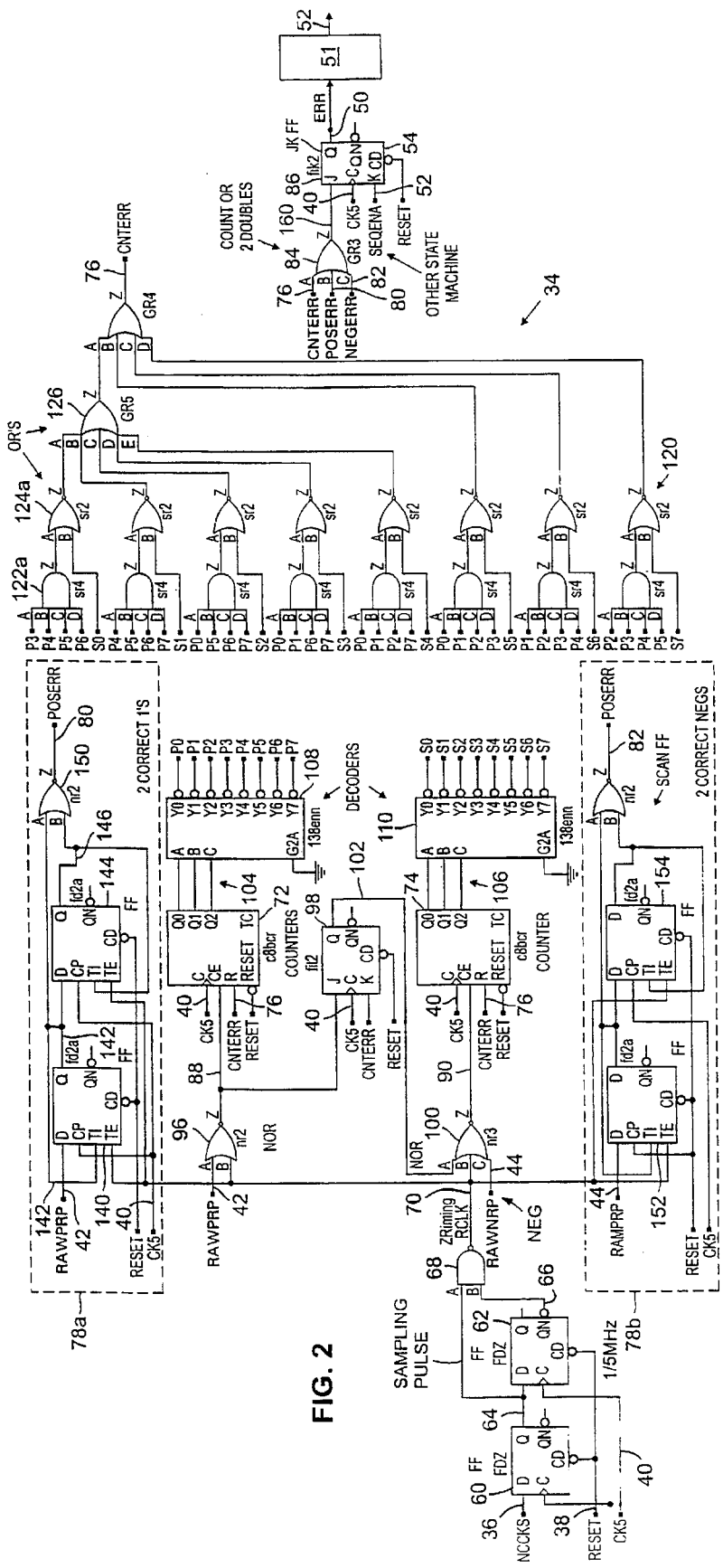
FIG. 2 is a more detailed circuit diagram of the mechanism of the invention in accordance with a preferred embodiment.

Referring to FIG. 2, in accordance with a preferred embodiment of the invention, there is illustrated a circuit, implemented in a gate array, which is designed to detect load imbalance on an incoming DDS loop. The load balance check circuitry 34 receives from the remainder of the OCU certain signals which enable it to properly operate. Circuitry 34 receives a data rate clock signal, synchronized to the incoming data, on a line 36, such that its rising edge corresponds to a valid data point. The circuitry 34 also receives a reset signal on a line 38 which, when the equipment turns on, resets all of the counters and flip flops of the circuitry 34. In addition, in the illustrated embodiment of the invention, the circuitry receives a five megahertz asynchronous clock signal over a line 40. The positive and negative pulses from the DDS loop 20 are received in raw form over lines 42 and 44 respectively. The circuit 34 provides, as an output, an error signal over a line 50.

The error signal is directed to a state machine 51 in the OCU which will recognize the error and respond to it. This state machine, also provides, in response to the recognition of the error, a signal over a line 52 which resets a JK flip flop 54 and accordingly the activating error signal over line 50.

In operation, when the system is first turned on, the reset signal over line 38 resets all of the flip flops and counters, which will be detailed hereinafter. Thereafter, a sampling pulse is generated, having a repetition rate equal to the data rate of the data clock signal over line 36 and a width equal to the cycle period of, in the illustrated embodiment, the five megahertz clock pulse over line 40. This signal is generated using a pair of flip flops 60, 62. Initially, the output of flip flop 60, over a line 64 is low and the output of flip flop 62, over its Q line 66 is high. Accordingly, the output of a NAND gate 68 over a line 70 is high.

Upon the receipt of the rising edge of the data clock over line 36, flip flop 60 is clocked and the Q output of flip flop 60 over line 64 goes high. As a result, both inputs to NAND gate 68 are high and the output of NAND gate 68 goes low. Upon the next clock pulse on line 40, the output of flip flop 62, over line 66, goes low causing the output of NAND gate 68 to go high. There results, therefore, a pulse having a width equal to the period of the clock signal over line 40 and having a data rate corresponding to the data rate of the data clock over line 36. This occurs since, when the data clock over line 36 goes low again the output of flip flop 60 over line 64 also goes low keeping the signal level on line 70 high until the data clock over line 36 again goes high.

The remainder of the circuitry 34 can be divided into two groups. A first group generates an output count error whenever the relative number of counts in a pair of counters 72, 74 differ by more than preset limits. The count error signal is provided over a line 76. An error condition is designated by a high signal value. A second group of circuitry detects two consecutive positive or negative pulses. This circuitry is designated by the circuitry labelled 78a and 78b in FIG. 2. The output of circuits 78a and 78b, over lines 80 and 82 respectively, designate, when high, an error condition. Accordingly, the three error signals over lines 76, 80, and 82 are input to an OR gate 84 and are thereafter clocked into a JK flip flop 86. Flip flop 86 thus generates the circuit error signal over line 50 upon the next occurrence of the clock signal over line 40.

Counters 72 and 74 count modulo 8, and thus are three bit counters which continuously count from zero through seven and then to zero again. These counters are incremented each time a clock pulse over line 40 occurs, if the signal over lines 88 and 90 respectively are high (that is the counters are enabled). However, the next count pulse, after the counter error signal over lines 76 goes high, acts to reset the counters to zero. Accordingly, the count error signal, as described below remains high for only one clock pulse of the clock over line 40 and is, in this sense, synchronously reset.

Referring now to the positive pulse counter 72, whenever a positive data pulse appears on line 42, and the data pulses are present on lines 42 and 44 when the signal level is low, the output of a NOR gate 96 goes high for a length of time corresponding to the clock pulse over line 70. This effectively enables counter 72 for one clock pulse time (200 nsec.). Accordingly, upon the next occurrence of the clock signal on line 40, the counter increments by one. A JK flip flop 98 is used to prevent the passage of count pulses, corresponding to negative pulses, through a NOR gate 100 until after the positive counter has incremented. By maintaining this protocol, a certain flexibility is provided in order to always maintain the current balance on the DDS loop within specified bounds.

Accordingly, flip flop 98 is set (being originally in its reset condition) upon the occurrence of the first clock pulse over line 40 coincident with the occurrence of a positive pulse as indicated by line 88 going high. As a result, the output of flip flop 98 goes high, as indicated over a line 102, which enables, effectively, NOR gate 100. Thereafter, counters 72 and 74 count incoming positive and negative pulses, respectively, and provide a three bit binary output over lines 104 and 106, respectively.

The binary count outputs of counters 72 and 74 are received by respective decoders 108 and 110. Each decoder provides an eight line output, one line for each count of the counter. A line goes negative when its corresponding count is present in the counter. These lines, designated P0 through P7 for the positive counts and S0 through S7 for the negative counts, are thus all high except for the line corresponding to the respective input binary numbers.

Figures 3, 4:
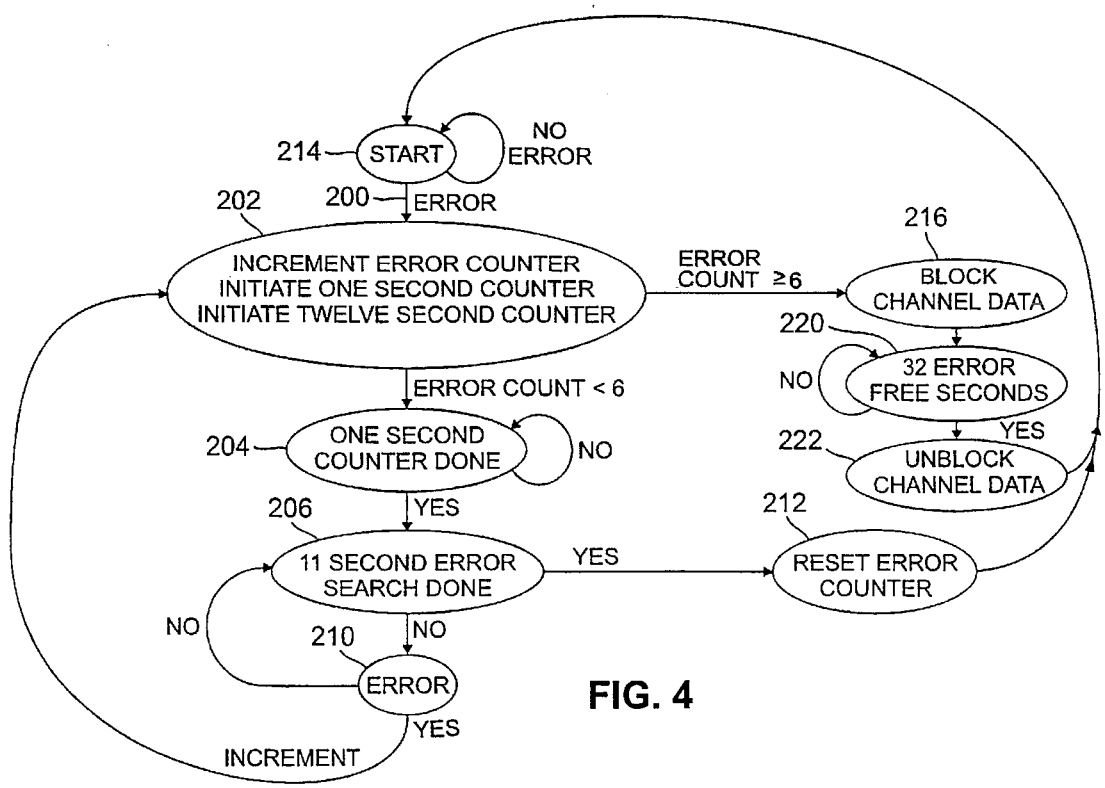
FIG. 3 is a chart showing error states for the counters in accordance with a preferred embodiment of the invention.
FIG. 4 is a detailed diagram of a state machine flow chart in accordance with a preferred embodiment of the invention.

The outputs of the decoders 108 and 110 are connected to a logic decoder circuit 120 which provides an output count error signal over line 76 whenever one of the conditions indicated in the table of FIG. 3 is met. Accordingly, each four input NAND gate 122 and a corresponding NOR gate 124 implement one row of the table while OR gates 126 and 128 implement the combination of all the rows so that if the condition of any one row is met, as indicated by an input of one of the OR gates 126, 128 going high, the output of OR gate 128 also goes high.

Thus, considering AND gate 122a and NOR gate 124a, when S0 is low indicating a count of zero in the negative pulse counter 74, all of the inputs to AND gate 122a must be high, indicating a condition where there is no error, in order for the output of NOR gate 124a to be low. If any one of the inputs to AND gate 122a is low, indicating the presence of a count in the positive counter which would result in an error condition according to FIG. 3, the output of the AND gate 122a is also low, causing the output of NOR gate 124a to be high. This, in turn, causes the output of OR gate 126 to be high which causes the output of OR gate 128 to be high. The remaining elements of the decoder circuit work in a similar manner to implement the table of FIG. 3.

In the illustrated embodiment of the invention, as noted above, counters 72 and 74 are three bit counters which count modulo 8. Further, in this illustrated embodiment, an error event is declared whenever the number of positive pulses is greater than two more than the number of negative pulses, or when the number of negative pulses is more than one greater than the number of positive pulses. Since the counters count modulo 8, a simple description of this threshold mechanism can be set forth, as illustrated in FIG. 3, in tabular form wherein, for each count in the negative pulse counter, a tabulation of the counts in the positive pulse counter which indicate an error is provided. In other embodiments of the invention, where an up-down counter can be implemented, and a positive pulse causes an increment of the count and a negative pulse causes a decrement of the count, other detecting circuitry can be employed.

Turning now to the pulse width circuits 78a and 78b, and in particular considering circuit 78a as representative, the positive pulse signal is available over line 42 to a flip flop 140. The flip flop 140, called a scanning flip flop, is designed so that when the signal over line 70 is high, the input signal, which is clocked in by the clock signal on line 40 is taken from a line 142. When the signal over line 70 is low, indicating a data pulse sampling period, the flip flop records the signal level over line 42 which is low only if a positive pulse is present. As a result, when the first pulse occurs on line 70, unless a positive pulse is present on line 42, the output of flip flop 140 over its output line 142, take on a high value. Thereafter unless a positive pulse is present on line 42, the flip flop stays in a set condition.

In a similar manner, a flip flop 144, also configured as a scanning flip flop, clocks its input from its output line 146 at all times, unless the signal over line 70 goes low. In that instance, the input over line 142, that is, the previous value stored in flip flop 140, is loaded into flip flop 144. In this manner, flip flops 140 and 144 contain, respectively, after a two pulse initialization, the most recent and the next most recent data inputs available over line 42. If both of those outputs are low, indicating two consecutive ones and a violation of the alternate mark inversion protocol, then, and only then, is the output of NOR gate 150 high. That is, both inputs to NOR gate 150 are low, a low signal being representative of the storage in flip flops 140 and 144 of a value representing consecutive ones at the input line 42.

The scanning flip flops 152 and 154 of circuitry 78b operate in an analogous manner with regard to the negative data signal available over line 44. Thus, the output over line 82 is high only if the flip flops 152 and 154 contain a zero value corresponding to the existence of two consecutive negative pulses on the DDS loop.

Accordingly, the OR gate 84 has a high output over its output line 160 whenever any of its inputs goes high. This corresponds to an error condition and, once high, that value is clocked into the flip flop 86 whose output over line 50 goes high. Once the state machine performing the statistical time analysis of the error output on line 50 has recorded the error value, the flip flop 86 will be cleared by a resetting signal value over line 52. In addition, and independent of the state machine reading the error value over line 50, the count error signal over line 76 acts to reset counters 70 and 72 as well as flip flop 98, thus resetting them to a condition corresponding to an initialized state. The consecutive pulse detection circuits 78a and 78b are not reset.

The output of the circuitry 34, as indicated above, is read by a state machine circuitry 200. In the illustrated embodiment of the invention that circuitry examines the statistical distribution of the error signals and preferably operates as follows.

In the illustrated embodiment of the invention, the error signals are processed in the state machine to meet a statistical time criterion which, in the illustrated embodiment of the invention, is defined as follows. When a first error signal over line 50 occurs, it initiates two timing periods. A first time period, the error time period (designated an error-second in the illustrated embodiment representing the one second duration in this embodiment) is a time window during which all further error signals from the error detection circuitry over line 50 will be ignored by the state machine. The other time period, which is initiated at the same time, has a duration equal to the maximum allowable time in which to receive a next error event signal over line 50 (after the termination of the error time period). In the illustrated embodiment of the invention, the second time period maximum value is set at twelve seconds. Thus, unless a next error event is detected within twelve seconds after the beginning of a previous error time period (but occurring after that previous error time period terminates) then the state machine generates a reset signal which resets the channel error event counter and begins the channel error search process anew. The third prong of the error criterion is that there must occur six error time periods before the channel error event counter (within the state machine) is reset in order for a channel error to be declared. Thus, short bursts of errors, occurring more than twelve seconds apart, will not trigger the abnormal station code signal as noted above. The operation of the state machine 200 is now described in more detail.

Referring to FIG. 4, when a first error signal over line 50 (indicated at 200 in FIG. 4) is received, state machine 51 initiates a time out period, one second in the illustrated embodiment, during which all further error signals over line 50 will be ignored. Referring to state 202, the state machine circuitry also, at this time, increments a previously reset channel error event counter. A maximum time error period, equal to 12 seconds in the illustrated embodiment, is also initiated. Since at this time the error counter only has a count on one, the state machine moves to state 204. At the end of the (one second) time out duration, the state machine passes to states 206, 208 and again awaits the occurrence of a next error signal. If an error signal does not occur within a maximum period of time, twelve seconds in the illustrated embodiment of the invention, the state machine channel error counter is reset to zero at state 212 and the state machine continues to await a next error signal, if any, at start state 214. If the error signal occurs within the maximum set time, new time-out durations, the one second and maximum time periods are initiated and the channel error event counter is increased by one. The state machine returns to state 202. This process continues until either the error event counter reaches a threshold value, six in the illustrated embodiment of the invention, in which case a channel error is declared at state 216, or the maximum time counter expires without receiving another error signal (after the maximum time-out period expires), in which case the error event counter is again reset to zero at start state 214.

Once a channel error has been declared, the OCU blocks the incoming channel signal from the noisy channel and replaces it with an abnormal station code signal (ASC) which is then transmitted to the network. This is signaled to the OCU when the state machine enters state 216. This alerts the network that the source of information is having channel problems and that no further data will be available until the channel problem is cleared up. In the illustrated embodiment of the invention, a cleared channel is defined as a channel which, once it has been declared an error channel, has an error free period of operation which, in the illustrated embodiment of the invention, lasts for at least thirty-two seconds. This is indicated at state 220. The state machine then unblocks the channel (state 222) and returns to starting state 214.

Additions, subtractions, and other modifications of the disclosed embodiments will be apparent to those practiced in this field and are within the scope of the following claims.

What is claimed is:

1. A method for monitoring the performance of a DDS loop connecting an information transmitter to an information receiver, said DDS loop using an alternate mark inversion communications protocol for effecting communications between the transmitter and the receiver, said monitoring method comprising the steps of:

counting, at the receiver, a first pulse of a selected polarity, separately counting at the receiver, succeeding positive and negative pulses from said DDS loop, declaring an error event whenever a difference between said counts of positive and negative pulses signals a current imbalance on said DDS loop, and replacing, at the receiver, said signals on said DDS loop from the transmitter when a statistical timing criteria for a plurality of said error events is met.

2. The method of claim 1 further comprising the step of terminating said replacing step when an uninterrupted error free sequence of signals is received at said receiver from said DDS loop for a threshold recovery time duration.

3. The method of claim 2 further wherein said terminating step terminates said replacing step when said uninterrupted sequence extends for at least thirty-two seconds.

4. The method of claim 1 wherein said replacing step further comprises the step of searching for a pattern of error-time units, wherein, for a succession of a certain member of error-time units, a maximum time duration between the beginning of successive error-time units is no greater than an error threshold value.

5. The method of claim 4 wherein the error threshold value is no more than twelve seconds.

6. The method of claim 5 wherein the error threshold value is twelve seconds.

7. The method of claim 6 wherein said certain number is six.

8. The method of claim 4 wherein said certain number is less than nine.

9. The method of claim 1 wherein said declaring step comprises the steps of differencing the counted values representing the number of pulses of one polarity and the number of pulses of the other polarity, modulo the counter size, and declaring said error event when said difference value exceeds a selected positive value or is less than a selected negative value.

10. The method of claim 9 wherein said first pulse is a positive pulse, said selected positive value is two, said selected negative value is minus one, and said difference is generated by subtracting, modulo the counter maximum value, the number of negative counts from the number of positive counts.

11. The method of claim 1 wherein said replacing step further comprises the step of sending onto a network an abnormal station signal in place of the signals coming from the DDS loop to the receiver.

12. The method of claim 2 wherein said separately counting step counts modulo n, and said declaring step further comprises the step of searching for a selected pattern of counts of positive and negative pulses.

13. An apparatus for monitoring the performance of a DDS loop connecting an information source transmitter to an information receiver, the DDS loop using an alternate mark inversion communications protocol for communicating between the receiver and the transmitter, the apparatus comprising;

a first counter, at the receiver, connected to the DDS loop for counting pulses of a first selected polarity, a second counter, at the receiver, connected to the DDS loop for counting pulses of a second polarity, circuitry for resetting the counters and for releasing the counters to count incoming pulses, a control circuitry for disabling the second counter until a first pulse is counted by the first counter, and for thereafter enabling both counters for counting, respectively, first and second polarity pulses on the DDS loop, error detection circuitry responsive to the counts of the counters for signalling an error event whenever a difference between the counts in the first and second counters exceeds either a first selected positive value or is less than a second selected negative value, the error detection circuitry thus declaring a current imbalance on the DDS loop, and signal modifying circuitry for replacing, at the receiver, the signals received from the DDS loop from the transmitter when a statistical timing criterion for a plurality of the signalled error events is met.

14. The apparatus of claim 13 wherein the signal modifying circuitry terminates the transmission of the replaced signals after receipt of an error free sequence on said loop for at least a minimum duration.

15. The apparatus of claim 13 further comprising a state machine for effecting a time-out period after the occurrence of an error event during which further error events are ignored, and after the time-out period elapses, enabling said state machine to receive and act upon a next error event.

16. The apparatus of claim 15 wherein said state machine further comprises circuitry for declaring a channel error when a sequence of at least six error periods occur and wherein the time duration between the beginning of successive error periods is no greater than a predetermined channel error threshold.

* * * * *